United States Patent [19]

Dean

[11] Patent Number: 4,497,928
[45] Date of Patent: Feb. 5, 1985

[54] MOLDABLE POLYBLEND CONTAINING POLY(ARYLENE SULFIDE)

[75] Inventor: Barry D. Dean, Broomall, Pa.

[73] Assignee: Atlantic Richfield Company, Los Angeles, Calif.

[21] Appl. No.: 624,306

[22] Filed: Jun. 25, 1984

[51] Int. Cl.$^3$ ............................ C08J 5/12; C08L 81/00
[52] U.S. Cl. .................................... 524/502; 525/189; 525/537
[58] Field of Search ................. 525/189, 537; 524/502

[56] References Cited

U.S. PATENT DOCUMENTS 4,212,923  7/1980  Brady .................................. 525/189

FOREIGN PATENT DOCUMENTS 0025356  2/1982  Japan .................................. 525/537

Primary Examiner—Jacob Ziegler
Attorney, Agent, or Firm—Dennis M. Kozak

[57] ABSTRACT

A moldable polyblend comprising a physical mixture of from about 99 to about 1% by weight poly(arylene sulfide) with from about 1 to about 99% by weight of a copolymer containing recurring units of a vinyl aromatic monomer and recurring units of a maleimide monomer is disclosed.

12 Claims, No Drawings

MOLDABLE POLYBLEND CONTAINING POLY(ARYLENE SULFIDE)

This invention relates to molding compositions.

More specifically, this invention relates to a moldable polyblend containing a poly(arylene sulfide) resin.

In one of its more specific aspects, this invention relates to the incorporation of a copolymer of a vinyl aromatic monomer and a maleimide monomer into a poly(arylene sulfide) to reduce the melt viscosity of the poly(arylene sulfide).

According to this invention, there is provided a moldable polyblend comprising a physical mixture of from about 99 to about 1% by weight of a poly(arylene sulfide) with from about 1 to about 99% by weight of a copolymer containing recurring units of a vinyl aromatic monomer and recurring units of a maleimide monomer.

Also, according to this invention there is provided a method of producing a molded polyblend which comprises forming a polyblend comprising a physical mixture of from about 99 to about 1% by weight of a poly(arylene sulfide) with from about 1 to about 99% by weight of a copolymer containing recurring units of a vinyl aromatic monomer and recurring units of a maleimide monomer, and molding the resulting polyblend.

According to the invention, there is also provided a method of reducing the melt viscosity of a poly(arylene sulfide) resin which comprises incorporating into the poly(arylene sulfide) resin a copolymer containing recurring units of a vinyl aromatic monomer and recurring units of a maleimide monomer, the copolymer being present in the poly(arylene sulfide) resin in an amount sufficient to reduce the melt viscosity of the poly(arylene sulfide) resin.

In a preferred embodiment, the poly(arylene sulfide) is poly(phenylene sulfide).

In another preferred embodiment of this invention, the polyblend will comprise from about 90 to 99% byweight poly(arylene sulfide) and from about 1 to about 10% by weight vinyl aromatic/maleimide copolymer.

Any suitable poly(arylene sulfide) can be employed in the practice of this invention. Incorporated herein are the teachings of U.S. Pat. Nos. 3,717,620 and 3,786,035, which describe usable poly(arylene sulfide) resins and teach methods for their production.

The vinyl aromatic/maleimide copolymer employed in the invention will comprise from about 50 to about 60 mole % recurring units of a vinyl aromatic monomer and from about 50 to about 40 mole % recurring units of a maleimide monomer. Preferably, the composition will contain 50 mole % recurring units of a vinyl aromatic monomer and 50 mole % recurring units of a maleimide monomer. The vinyl aromatic/maleimide copolymer should have a peak molecular weight from 50,000 to 500,000; most preferably 50,000 to 150,000.

The vinyl aromatic monomer may be styrene, p-methylstyrene, vinyl toluene, t-butylstyrene, α-methylstyrene, monobromostyrene, dibromostyrene, tribromostyrene, monochlorostyrene, dichlorostyrene, trichlorostyrene, dimethylstyrene and the like, and their mixtures. The vinyl aromatic monomer most preferred is styrene.

The maleimide monomer may be maleimide, N-methylmaleimide, N-ethylmaleimide, N-propylmaleimide, N-butylmaleimide, N-phenylmaleimide, N-(tolyl)maleimide, N-(2,5-dimethyl)maleimide, N-(2,6-dimethyl)maleimide, N-(2-chlorophenyl)maleimide, N-(3-chlorophenyl)maleimide, N-(4-chlorophenyl)-maleimide, N-(2,3-dichlorophenyl) maleimide, N-(2,4-dichlorophenyl)maleimide, N-(2,5-dichlorophenyl)-maleimide, N-(2,6-dichlorophenyl)maleimide, N-(2-bromophenylmaleimide, N-(3-bromophenyl)maleimide, N-(4-bromophenyl)maleimide, N-(2,3-dibromophenyl)-maleimide, N-(2,4-dibromophenyl) maleimide, N-(2,5-dibromophenyl)maleimide, N-(2,6-dibromophenyl)-maleimide, tribromophenylmaleimide, and the like and their mixtures. The maleimide most preferred is N-phenylmaleimide.

The vinyl aromatic/maleimide copolymer can be prepared in a bulk process, a continuous bulk process, a solution process or a suspension process. The preferred method of preparation is a suspension process.

The moldable polyblends of this invention can also include other ingredients such as extenders, fillers, processing aids, pigments, mold release agents and the like, for their conventionally employed purpose. Also, reinforcing fillers in amounts sufficient to impart reinforcement can be incorporated, such as glass flakes and chopped glass fibers.

The following examples serve to demonstrate the invention.

EXAMPLE 1

This example serves to demonstrate the preparation of a styrene/N-phenylmaleimide copolymer suitable for use in this invention by the suspension process.

A citrate bottle was charged with about 140 grams of water, 37.6 grams of styrene, 62.4 grams of N-phenylmaleimide, 0.57 gram of t-butylperoctoate, 0.32 gram of t-butyl perbenzoate, 0.002 gram of sodium bisulfite and 1.8 grams of tricalciumphosphate. The bottle was capped and placed in an oil bath with constant agitation. The bottle was heated to 95° C. for 1.0 hour and then to 140° C. for 3.5 hours. The beads which formed were filtered, acidified to pH=1.0 and washed with water. The total weight of the beads recovered was 99.2 grams (99.2% conversion). The copolymer analyzed and found to contain 5.1% N which corresponds to 63.02 wt. % N-phenylmaleimide (50 mole %). The copolymer was tested and found to exhibit a glass transition temperature of 223° C. by differential scanning calorimetry. The copolymer had a peak molecular weight of 188,000, a weight average molecular weight (Mw) of 298,000 and a number average molecular weight (Mn) of 129,600.

EXAMPLES 2–4

The following examples demonstrate the preparation of a control and two moldable polyblends of this invention.

Ryton ® P-4 poly(phenylene sulfide), commercially available from Phillips Petroleum Company, was melt compounded with the styrene/N-phenylmaleimide (S/NPMI) copolymer produced in Example 1 at 325° C. Test specimens were molded at 320° C. to assess physical properties and melt rheology. The compositions of the polyblends, their physical properties and melt rheology data are shown in following Table I.

TABLE I

| | Example No. | | |
| --- | --- | --- | --- |
| | 2(Control) | 3 | 4 |
| Ryton ® P-4 | 100 | 100 | 100 |

TABLE I-continued

| | Example No. | | |
|---|---|---|---|
| | 2(Control) | 3 | 4 |
| poly(phenylene sulfide) | | | |
| S/NPMI(phr) | 0 | 2.5 | 5 |
| Tensile strength (psi) | 7800 | 8100 | 8050 |
| Flex strength (psi) | 14,800 | 14,200 | 13,890 |
| Flex modulus (psi) | 613,610 | 610,740 | 610,840 |
| DTUL (⅛", °F., (unannealed) | 208 | 207 | 209 |
| Notched Izod (Ft lbs/in) | 0.19 | 0.19 | 0.19 |
| Elongation (%) | 1.4 | 1.9 | 1.9 |
| Instron melt rheology (325° C., L/D = 20, (poise) at $\gamma(sec^{-1})$ of: | | | |
| 29.45 | 10,563 | 5668 | 4210 |
| 147.27 | 4122 | 2125 | 2018 |
| 589.09 | 1958 | 907 | 321 |
| 2945.47 | 902 | 327 | 145 |
| 5890.94 | 605 | 310 | 145 |

The data of Table I serve to show that copolymers of a vinyl aromatic monomer and a maleimide monomer substantially reduce the melt viscosity of poly(arylene sulfide) resins without having a deleterious effect on physical properties upon molding.

It will be evident from the foregoing that various modifications can be made to this invention. Such, however, are considered as being within the scope of the invention.

What is claimed is:

1. A moldable polyblend comprising a physical mixture of from about 99 to about 1% by weight of a poly(arylene sulfide) with from about 1 to about 99% by weight of a copolymer containing recurring units of a vinyl aromatic monomer and recurring units of a maleimide monomer.

2. The polyblend of claim 1 comprising from about 90 to about 99% by weight of said poly(arylene sulfide) and from about 1 to about 10% by weight of said copolymer.

3. The polyblend of claim 1 in which said copolymer comprises from about 50 to about 60 mole % vinyl aromatic monomer and from about 50 to about 40 mole % of a maleimide monomer.

4. The polyblend of claim 1 in which said copolymer had a peak molecular weight within the range of from about 50,000 to about 500,000.

5. The polyblend of claim 1 in which said poly(arylene sulfide) is poly(phenylene sulfide).

6. The polyblend of claim 1 in which said copolymer said vinyl aromatic monomer is selected from the group consisting of at least one of styrene, p-methyl-styrene, vinyl toluene, t-butylstyrene, α-methylstyrene, monobromostyrene, dibromostyrene, tribromostyrene, monochlorostyrene, dichlorostyrene, trichlorostyrene and, dimethylstyrene.

7. The polyblend of claim 1 in which said copolymer said maleimide monomer is selected from the group consisting of at least one of maleimide N-methylmaleimide, N-ethylmaleimide, N-propylmaleimide, N-butylmaleimide, N-phenylmaleimide, N-(tolyl)maleimide, N-(2,5-dimethyl)maleimide, N-(2,6-dimethyl)maleimide, N-(2-chlorophenyl)maleimide, N-(3-chlorophenyl)maleimide, N-(4-chlorophenyl)maleimide, N-(2,3-dichlorophenyl) maleimide, N-(2,4-dichlorophenyl)maleimide, N-(2,5-dichlorophenyl)maleimide, N-(2,6-dichlorophenyl)maleimide, N-(2-bromophenyl)maleimide, N-(3-bromophenyl)maleimide, N-(4-bromophenyl)maleimide, N-(2,3-dibromophenyl)maleimide, N-(2,4-dibromophenyl) maleimide, N-(2,5-dibromophenyl)maleimide, N-(2,6-dibromophenyl)maleimide and, tribromophenylmaleimide.

8. The polyblend of claim 1 in which said copolymer is styrene/N-phenylmaleimide.

9. A method of producing a molded polyblend comprising the steps of forming a polyblend comprising a physical mixture of from about 99 to about 1% by weight of a poly(arylene sulfide) with from about 1 to about 99% by weight of a copolymer containing recurring units of a vinyl aromatic monomer and recurring units of a maleimide monomer, and molding the resulting polyblend.

10. The method of claim 9 in which said polyblend is molded in contact with a reinforcing filler.

11. The method of claim 9 in which said reinforcing filler is glass fibers.

12. A method of reducing the melt viscosity of a poly(arylene sulfide) resin which comprises incorporating into the poly(arylene sulfide) resin a copolymer containing recurring units of a vinyl aromatic monomer and recurring units of a maleimide monomer, the copolymer being present in the poly(arylene sulfide) resin in an amount sufficient to reduce the melt viscosity of the poly(arylene sulfide) resin.

* * * * *